US010671942B1

(12) United States Patent
McGovern et al.

(10) Patent No.: US 10,671,942 B1
(45) Date of Patent: Jun. 2, 2020

(54) TUNABLE BIAS REDUCTION PIPELINE

(71) Applicant: Accenture Global Solutions Limited, Dublin (IE)

(72) Inventors: Aonghus McGovern, Dublin (IE); Abhishek Khanna, Dublin (IE); Rebekah Murphy, Dublin (IE); Steve Cooper, Dublin (IE); Xin Zuo, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/423,067

(22) Filed: May 27, 2019

Related U.S. Application Data

(60) Provisional application No. 62/812,005, filed on Feb. 28, 2019.

(51) Int. Cl.
*G06N 20/00* (2019.01)
*G06K 9/62* (2006.01)
*G06F 40/20* (2020.01)

(52) U.S. Cl.
CPC .............. *G06N 20/00* (2019.01); *G06F 40/20* (2020.01); *G06K 9/6215* (2013.01); *G06K 9/6267* (2013.01)

(58) Field of Classification Search
CPC ...... G06N 20/00; G06F 17/27; G06K 9/6215; G06K 9/6267
See application file for complete search history.

(56) References Cited

PUBLICATIONS

Bolukbasi, Tolga, et al. "Quantifying and reducing stereotypes in word ennbeddings." arXiv preprint arXiv:1606.06121 (2016). (Year: 2016).*

Zhao, Jieyu, et al. "Gender bias in coreference resolution: Evaluation and debiasing methods." arXiv preprint arXiv:1804.06876 (2018). (Year: 2018).*

Bechavod, Yahav, and Katrina Ligett. "Penalizing unfairness in binary classification." arXiv preprint arXiv:1707.00044 (2017). (Year: 2017).*

(Continued)

*Primary Examiner* — Eric Nilsson
(74) *Attorney, Agent, or Firm* — Brinks Gilson & Lione

(57) ABSTRACT

The systems and methods to reduce bias in an artificial intelligence model are provided. The system may receive word embedding model generated based on a corpus of words. The system may determine a bias definition vector in an embedding space of the word embedding model. The system may receive bias classification criteria. The bias classification criteria may include logic to group word vectors in the word embedding model based on a distance measurement from the bias definition vector. The system may identify, in the word embedding model, a first group of vectors and a second group of vectors based on the bias classification criteria and the bias definition vector. The system may generate a debiased artificial intelligence model. The debiased artificial intelligence model may include associations between words and metrics. The system may weight the metrics for the words associated with the first group of vectors and second group of vectors with a non-zero penalization factor.

19 Claims, 7 Drawing Sheets

(56) References Cited

PUBLICATIONS

Zimmermann, Tim, Leo Kotschenreuther, and Karsten Schmidt. "Data-driven HR-Resume Analysis Based on Natural Language Processing and Machine Learning." arXiv preprint arXiv:1606.05611 (2016). (Year: 2016).*

Tolga Bolukbasi et al., "Man is to Computer Programmer as Woman is to Homemaker? Debiasing Word Embeddings," dated Jul. 21, 2016, pp. 1-25, published online by Cornell University at URL https://arxiv.org/pdf/1607.06520.pdf, Ithica, NY.

* cited by examiner

TUNABLE BIAS REDUCTION PIPELINE

CROSS REFERENCE TO RELATED APPLICATIONS

This application claims the benefit of U.S. Provisional Application No. 62/812,005 filed Feb. 28, 2019, the entirety of which is hereby incorporated by reference.

TECHNICAL FIELD

This disclosure relates to machine learning and, in particular, to bias reduction in machine learning.

BACKGROUND

Organizational entities, such as human resources, may have an interest in reducing biases in organization activities, such as hiring personnel. Organizations may rely on artificial intelligence models to assist with organizations activities. Training the artificial intelligence models may introduce inherent biases to the models. For example, during supervised learning, annotated data may be generated to establish learned mappings and associations. The annotated data may include biases from humans facilitating the annotations, or the underlying data may have inherent biases being derived from human social and cultural norms. In some circumstances, the annotation may be computer automated, but the computer automation may be derived from other trained models and/or computer algorithms with inherent bias. Thus, artificial intelligence models may include systematic bias.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
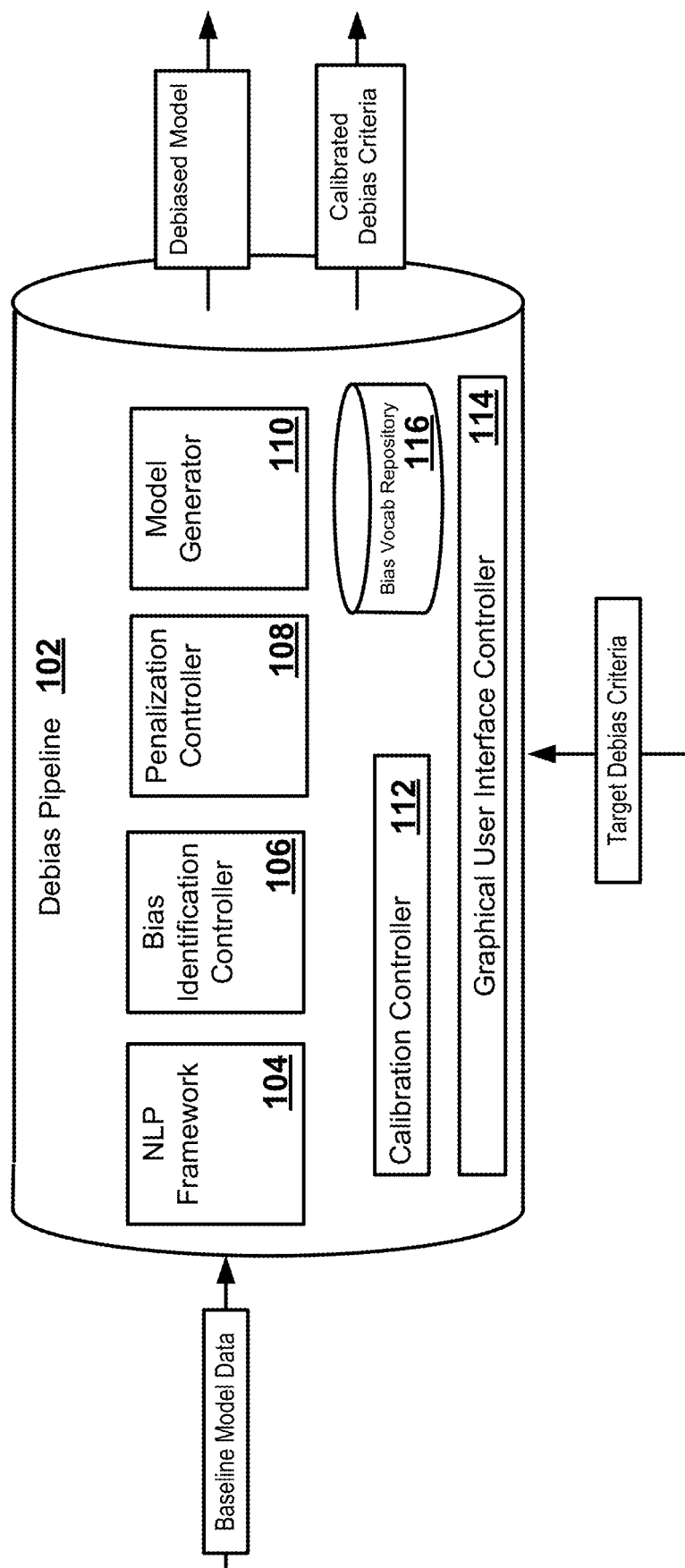
FIG. 1 illustrates a first example of a system.

Organizational entities, such as human resources, may have an interest in reducing biases in organization activities, such as hiring personnel. Organizations may rely on artificial intelligence models to assist with organizations activities. Training the artificial intelligence models may introduce inherent biases to the training. For example, during supervised learning, annotated data may be generated to establish learned mappings and associations. The annotated data may include biases based on the humans facilitating the annotations, or the underlying data may have inherent biases being derived from human social and cultural norms. In some circumstances, the annotation may be computer automated, but the computer automation may be derived from other trained models and/or computer procedurals with inherent bias. Thus, artificial intelligence models may include systematic bias.

Present approaches to identifying and reducing algorithmic bias may provide little to no control over establishing tunable and class specific bias thresholds and penalization. Moreover, reducing bias in models may negatively impact model performance and inference accuracy. Zeroing penalized word vectors to negate bias words, as described Tolga Bolukbasi et al., "Man is to Computer Programmer as Woman is to Homemaker? Debiasing Word Embeddings," dated Jul. 21, 2016, pp. 1-25, published online by Cornell University at URL https://arxiv.org/pdf/1607.06520.pdf, Ithica, N.Y., which is hereby incorporated by reference in its entirety, may inhibit model performance, particularly in settings where a certain amount of bias is acceptable.

Accordingly, there is disclosed digital systems and methods for tunable bias reduction in artificial intelligence models. By way of an introductory example, the system may receive a word embedding model generated based on a corpus of words. The word embedding model may include word vectors representative of the corpus of words. The system may determine a bias definition vector in an embedding space of the word embedding model. The bias definition vector may be defined along a bias axis in the embedding space of the word embedding model. The bias axis may represent a bias type. The system may receive bias classification criteria. The bias classification criteria may include logic to group the word vectors based on a distance measurement from the bias definition vector. The system may identify, in the word embedding model, a first group of word vectors and a second group of word vectors based on the bias classification criteria and the bias definition vector. The first group of word vectors may represent a first bias category for a bias type and the second group of word vectors may represent a second bias category for a bias type. The system may generate a debiased artificial intelligence model, the debiased artificial intelligence model may include metrics representative of words. Metrics for words associated with the first group of word vectors and metrics for words associated with the second group of word vectors may be weighted based on a non-zero penalization factor.

One example of a technical advancement provided by the system and methods described herein may be that the system may reduce bias in applications that leverage unstructured text. Bias reduction may be configured according to user specific parameters that define acceptable bias in an easy to understand construct. For example, a user may provide a debias criteria, such as a target word ratio. The target word ratio may indicate a ratio of bias words within bias categories. The target word ratio may be a measure for the level of acceptable bias in a debiased model generated. The system may debias a model such that the model satisfies the debias criteria. For example, word representations in the model may be penalized such that each category is penalized in proportion to the target word ratio.

Another technical advancement of the system and methods described herein is that the system may calibrate the target bias criteria so that model performance is not inhibited. For example, the target word ratio may not be reasonably achievable based on the training data provided to the system. The system may calibrate the target bias criteria to achieve the next-best word ratio. The system may display the calibrated word ratio to an end user who may accept or reject the result.

Another technical advancement of the system and methods described herein is that the system may generate and/or deploy an artificial intelligence model where bias is decreased based on non-zero penalization of bias vocabularies. For example, the vectors in a word embedding model may be penalized to the extent necessary to achieve the target word ratio provided by a user. Thus, negative impacts to the accuracy, integrity, and performance of the updated model are minimized to achieve a debiasing goal. In some examples, the pipeline may apply penalization weights to a variety of different models, including word embedding model, term frequency-inverse document frequency (TF-IDF) model, or any combination thereof.

Another technical advancement of the system and methods described herein is that the artificial intelligence models improved by the system and methods described herein may be deployed in a practical environment. For example, the debiased artificial intelligence models may be deployed to match resumes with job descriptions to reduce gender, or other types of bias. Alternatively or in addition, the debiased model may be deployed to facilitate supervised tasks such as regression (e.g. predicting an individual's credit score) and classification (e.g. automatically determining whether an individual qualifies for government assistance) to reduce demographic, or other types of bias.

The systems and methods described herein offer improvements over existing market solutions. The additional benefits, efficiencies, and improvements over existing market solutions are made evident in the systems and methods described below.

FIG. 1 illustrates a first example of a system 100. The system may include a debias pipeline 102. The debias pipeline 102 may receive baseline model data. The baseline model data may include an artificial intelligence model or information used to train or generate an artificial intelligence model. For example, the baseline model data may receive a word embedding model. In some examples, the word embedding model may have been previously trained to perform classification, regression, or other inference determinations. Alternatively or in addition, the baseline model data may include training information to generate a natural language model. For example, the training information may include a corpus of words, annotated natural language text, and/or other suitable training information.

The debias pipeline 102 may include a natural language processing (NLP) framework 104. The NLP framework 104 may generate a word embedding model based on natural language text. For example, the NLP framework 104 may include, for example, WORD2VEC, GLOVE, or any other word embedding framework.

A word embedding model may include mathematical mappings of words into a multi-dimensional embedding space. The word embedding model may represent words as vectors of real numbers. By way of example, a word embedding model may include a matrix where each row (or column) of the matrix may be a particular vector that is representative of a word. The dimensional values of the particular vector may orient the vector in the multi-dimensional space with respect to other vectors such that associations between vectors may be established via statistical measurements and computer-generated inferences. The word embedding model may be trained or retrained by weighting a vector (or vectors) of the word embedding model so that the associations between the vector and other vectors is strengthened or weakened.

The vectors of a word embedding model may be biased based on a particular bias type. A bias type represents categories of bias that have common characteristics. A bias category may include a classification of bias. For example, male bias or female bias are both bias categories of a gender bias type.

The debasing pipeline 102 may include a bias identification controller 106. The bias identification controller 106 may identify a bias definition vector in a word embedding model. The bias definition vector may include a vector that represents a bias category for a bias type. Once a bias category vector is identified, a bias axis may be derived. The bias axis may represents a type of bias (i.e. gender, race, ethnicity, age, or some other generalization in the embedding space). The vector that defines the bias definition vector may be expressed as $$V_b = V_{c1} - V_{c2}$$

where $V_b$ is the bias definition vector, $V_{c1}$ is a vector representative of first bias category, and $V_{c2}$ is a vector representative if a second bias category. The bias axis for the type of bias may be defined along $V_b$ and $-V_b$.

By way of example, the bias axis for gender may be defined along the bias definition vector ($V_b$). The bias definition vector may be derived by subtracting a vector representative of "male" ($V_{c1}$) from a vector representative of "female." ($V_{c2}$). When calculated as such, word vectors close to $V_b$ may exhibit bias toward the "male" bias category, and vectors close to $-V_b$ may exhibit bias toward the female bias category.

Figure 2B:
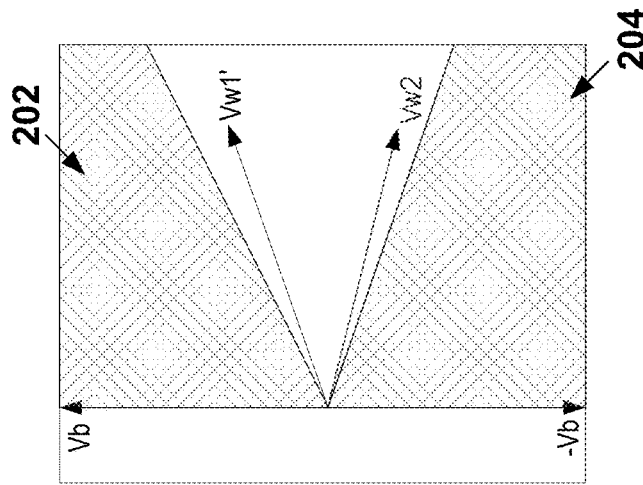
FIG. 2A-B illustrates examples of a visual representation of a word embedding model space.
Figure 2A:
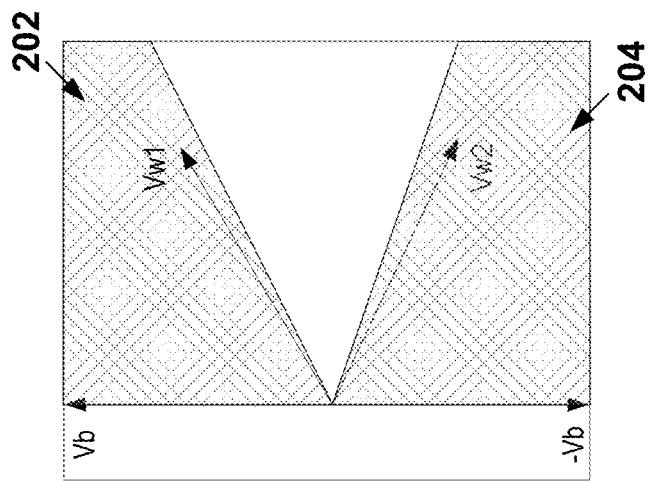

The following discussion of FIG. 1 includes various references to FIG. 2A-B. FIG. 2A-B illustrates examples of a visual representation of a word embedding model space. For simplicity of explanation, the word embedding model space illustrated in FIGS. 2A-2B includes two dimensions. In practice, the word embedding model space may include N dimensions. Reference to FIGS. 2A-B is made throughout the remaining discussion of FIG. 1.

The bias identification controller 106 may determine distances between vectors. Referring to FIG. 2A, the bias definition vector $V_b$ and a word vector $V_{w1}$ may be separated by a distance. The distance may be measured based on, for example, an angular similarity or an angular distance. The distance may be measured according to a cosine similarity calculation or a cosine distance calculation. As the cosine similarity metric approaches 1, the angular distance between the bias definitions vector $V_b$ and the word vector $V_{w1}$ decreases. As the cosine metric approaches -1, vectors the angular distance between the bias definition vector $V_b$ and the word vector increases. Continuing with the previous gender example where the first bias category is female and the second bias category is male, a word vector with a cosine similarity of 0.9 may represent a word that is biased toward the male category. A vector with a cosine similarity of -0.9 may represent a word that is biased toward the female category.

The bias identification controller 106 may identify one or more bias vector groups based on bias classification criteria. Bias classification criteria may include logic to identify one or more bias vector group. A bias vector group may include a group of vectors that are located within (or outside of) a certain distance from the bias definition vector. As illustrated in FIG. 2A, the bias classification criteria may define first region 202 and/or a second region 204 in the word embedding model space. The first region 202 may include a first bias vector group. The second region 204 may include a second bias vector group.

The bias classification criteria may include a bias threshold value, or multiple bias threshold values. A bias threshold value may include a threshold distance measurement, a threshold similarity measurement, or some other threshold value that governs the number of vectors included in a bias vector group. Table 1 provides an example of a bias classification criteria.

TABLE 1

Bias Classification Criteria Example

Include $V_n$ in bias vector group 1 if AngularSim ($V_n$, $V_b$) > α
Include $V_n$ in bias vector group 2 if AngularSim ($V_n$, $V_b$) < β
where $V_b$ is the bias definition vector,
$V_n$ is a word vector
α is a first bias threshold for a first bias category
β is a second bias threshold for a second bias category In the examples shown in Table 1, AngularSim( ) may represent cosine similarity, or some other measurement of vector distance. Other measures of distance may also apply, including, for example, cosine distance (e.g. 1−cos similarity). In other examples, other manners of distance calculations may be utilized as well, including for example, Euclidean distance. Thus, the example illustrated in Table 1 is intended of example purposes and other bias classification criteria for separators vectors into separate vector groups may apply.

The bias identification controller 106 may calibrate the bias classification criteria. For example, the bias identification controller 106 may receive a target debias criteria. The target debias criteria may include, for example, a target word ratio.

A target word ratio may include a target ratio of words that are included in the first bias category and the second bias category. The bias identification controller 106 may modify the bias classification criteria based on the target word ratio. Modifying the bias classification criteria may modify the quantity of vectors that are classified in a particular bias vector group. For example, the bias identification criteria may generate updated bias threshold(s) to calibrate how many vectors are included in each bias vector group. Referring to the example in Table 1, increasing the first bias threshold α increases the quantity of vectors included the first bias vector group. Decreasing the first bias threshold α decreases the quantity of vectors included the first bias vector group. Referring to FIG. 2A, increasing the first bias threshold α may increase the area of the first region 202, and decreasing the first bias threshold α may decrease the area of the first region 202. Thus, the first bias threshold α may govern the size of the region 202 and/or whether the first word vector $V_{w1}$ (or other vectors) is included in the first bias group. Likewise, the second bias threshold β may govern the size of the second region 204 and/or whether the second word vector $V_{w2}$ (or other vectors) is included in the second bias vector group. Decreasing β may increase the number of vectors in the second bias group and increase β may decrease the number of vectors in the second bias group.

The debias pipeline 102 may include a penalization controller 108. The penalization controller 108 may assign a penalization factor to one or more vectors that satisfy the bias classification criteria. The penalization controller 108 may select the word vectors in response to the word vector satisfying the bias classification criteria. For example, referring to FIG. 2A, the penalization controller 108 may select the first word vector $V_{w1}$ and the second word vector $V_{w1}$ in response to these vectors satisfying the bias classification criteria (i.e. being within a certain distance of the bias axis ($V_b$, −$V_b$).

In some examples, the penalization controller 108 may calibrate the penalization factor. For example, the penalization controller 108 may receive an updated penalization factor. Updating the penalization factor may vary the amount a particular vector is penalized. For example, lowering the penalization factor may decrease the distance between a particular vector and the bias definition vector $V_b$. Increasing the penalization factor may increase the distance between the particular word vector and the bias definition vector $V_b$.

The debias pipeline 102 may include a model generator 110. In some examples, the model generator 110 may generate an updated word embedding model. For example, the model generator 110 may apply the penalization factor to vectors in one or more bias vector groups. For example, the model generator 110 may receive an identifier of a vector, or group of vectors. The model generator 110 may penalize the vector, or group of vectors, based on a penalization factor. Referring to the example in FIG. 2A, the first word vector $V_{w1}$ and the second word vector $V_{w2}$ may each satisfy the bias classification criteria. The vectors $V_{w1}$ and $V_{w2}$ may be selected for penalization. The model generator 110 may penalize the first word vector $V_{w1}$ and/or the second word vector $V_{w2}$ based on the penalization factor. Referring to FIG. 2B, the updated embedding space may include the penalized first word vector $V_{w1'}$ and the penalized second word vector $V_{w2'}$. The penalized first word vector $V_{w1'}$ may be further away from the bias definition vector $V_b$ than the original second word vector $V_{w1}$. The penalized second word vector $V_{w2'}$ may be closer to the bias definition vector $V_b$ (i.e. further away from −$V_b$) than the original second word vector $V_{w2}$.

To generate an updated word embedding model, the model generator 110 may penalize a vector based on the following equation:

$$V_{new} = V_{old} - \Phi * V_b * \left( \frac{V_{old} * V_b}{V_{old}^2} \right)$$

where $V_{new}$ is the penalized vector, $V_{old}$ is the original vector, and φ is the penalization factor. In other examples, the model generator 110 may penalized the vector $V_{new}$ based on an additional or alternative combination of the penalization factor φ and the original vector $V_{old}$.

In some examples, the model generator 110 may generate a TF-IDF model. The TF-IDF model may include various weights assigned to words. The model generator 110 may determine that the words associated with the TF-IDF model are also associated with one or more vectors that are selected for penalization. For example, the model generator 110 may determine that a group of words in the TF-IDF model have vector representations that are included a bias vector group. The model generator 110 may apply a penalization factor to the weights to penalize the word in the TF-IDF model. For example, the model generator 110 may multiply the penalization factor by the weight assigned to the word.

Calibrating the bias classification criteria and/or the penalization factor may change the words that are included in a first and/or second bias category. The bias associations with these words may be weakened, resulting in an artificial intelligence model where a type of bias has been reduced. However, human modification of the penalization factor and/or the bias classification criteria may create inefficient or inaccurate models. Moreover, the penalization factor and bias classification criteria may be difficult and/or non-intuitive for a human operator to understand and adjust.

Figure 5:
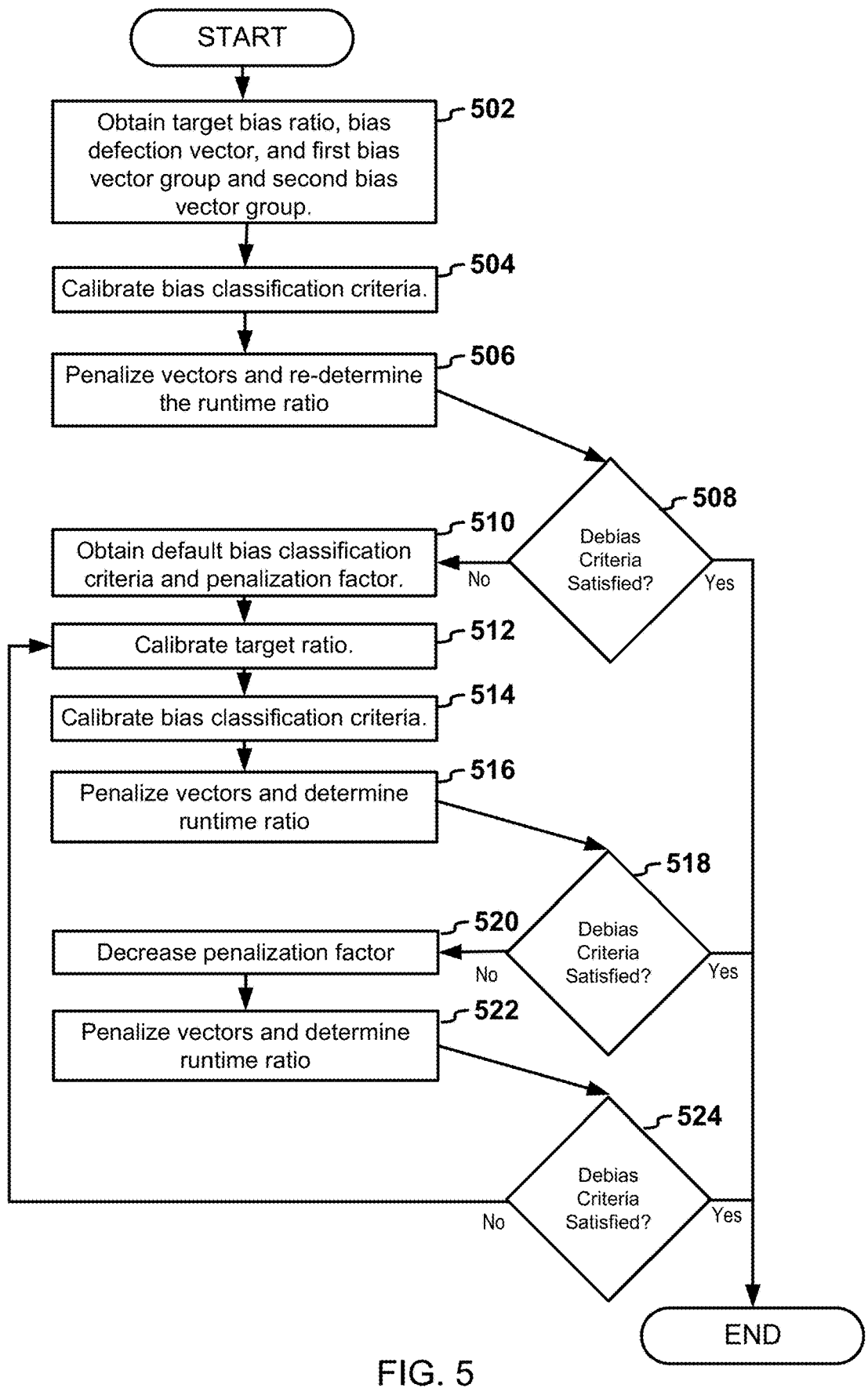
FIG. 5 illustrates a flow diagram for example logic of a system.

The debias pipeline 102 may include a calibration controller 112. The calibration controller 112 may generate a debias criteria. The debias criteria may include a rule that establishes the number of bias words permitted in one or more bias vocabularies. For example, the debias criteria may include the target word ratio, as previously discussed. The calibration controller 112 may communicate with the natural language processor 104, the bias identification controller 106, the penalization controller 108, and/or the model generator 110 to determine a penalization factor and/or bias classification criteria that causes a word embedding model to satisfy the debias criteria. The calibration controller 112 may cause calibration of the penalization factor and/or the bias classification criteria to achieve the target word ratio. In some examples, it may not be possible to achieve the target word ratio without reducing model performance. The calibration controller 112 may also calibrate the target word ratio to determine the next best ratio to achieve a debias result. FIG. 5, and the related discussion, describes calibration of the target word ratio, the bias classification criteria, and the penalization factor.

In some examples, the debias pipeline 102 may include a graphical user interface controller 114. The graphical user interface controller 114 may generate one or more interactive view. The interactive view may include a control to receive the target debias criteria. For example, the control may receive a target word ratio. Alternatively or in addition, the graphical user interface may controller 114 generate one or more control to receive the baseline model data. For example, the control may receive a path to a file including training data and/or word embedding model. Alternatively or in addition, interactive view may include one or more control receive other user-defined parameter(s) such as, for example, the bias classification criteria and/or the penalization factor. In some examples, the interactive view may include a control to receive input that initiates debiasing. For example, the control may include a button. The graphical user interface controller 114 may instruct the debias pipeline 102 to perform debasing in response to interaction with the control. In some examples, the graphical user interface may display the calibrated debias criteria after a model, or training data, has been debiased. As described herein, the debias pipeline 102 may adjust the target word ratio to achieve a debias result. The user interface may display the adjusted target word ratio so that a user may view the difference between the original target ratio and the calibrated target ratio actually achieved.

In some examples, the debias pipeline 102 may include a bias vocabulary repository 116. The bias vocabulary repository 116 may store words and/or vector identifiers that are associated with a bias category and/or a bias vector group. For example, the bias vocabulary repository 116 may be queried to determine a run-time ratio of vectors in a first bias vector group and a second bias vector group. Alternatively or in addition, the bias vocabulary repository 116 may be queried to identify text for words associated with a bias category. For example, the bias vocabulary repository may be queried to determine the words and/or vectors associated with a particular bias category. The NLP framework 104 may store text of words parsed from the baseline model data in the bias vocabulary repository 116. The bias identification controller 106 may associate the words with particular vectors, and store the associations in the bias vocabulary repository 116. Alternatively or in addition, the bias identification controller 106 may store mappings between words or vectors and particular bias categories in the bias vocabulary repository 116. The mappings may be updated as the bias calibration criteria, penalization factor, and target word ratio are calibrated.

Figure 3:
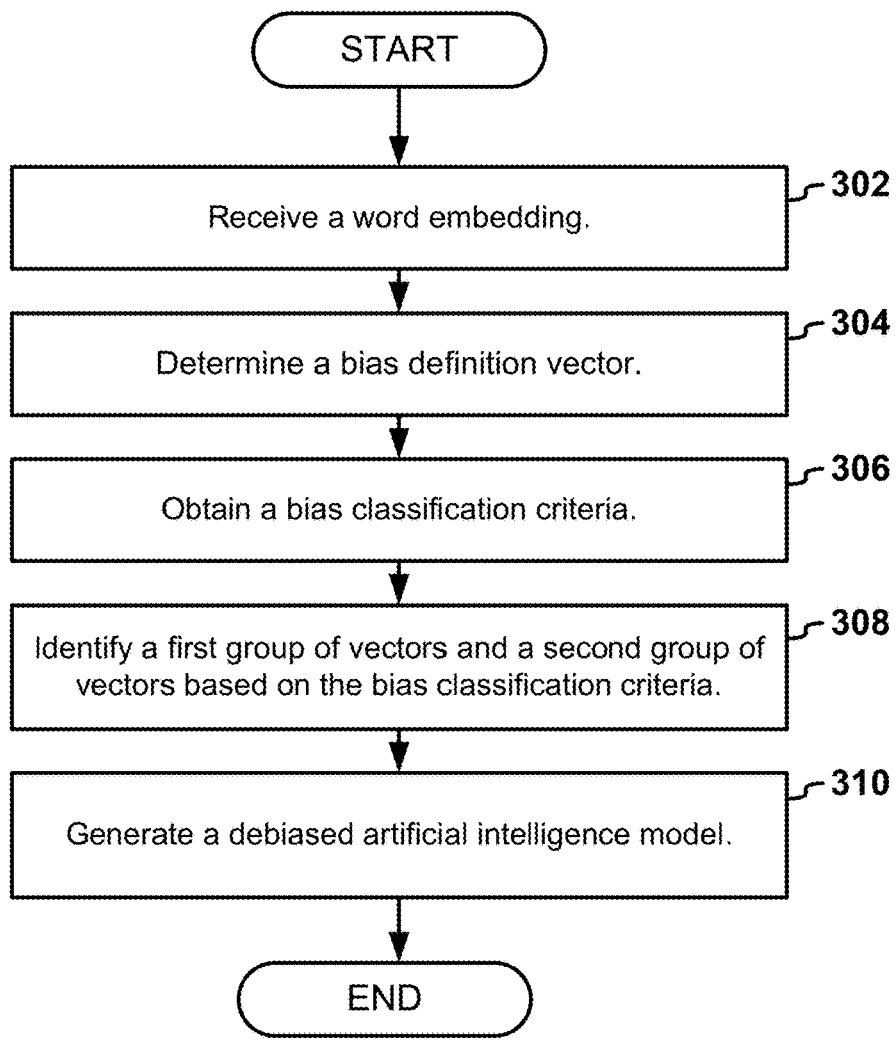
FIG. 3 illustrates a flow diagram for example logic of a system.

FIG. 3 illustrates a flow diagram for example logic of the system 100. The debias pipeline 102 may receive a word embedding model (302). The word embedding model may be generated based on a corpus of words. For example, the corpus of words may have been previously created to train a word-embedding model to provide inferences in a particular application, such as matching skill qualifications to role descriptions.

The debias pipeline 102 may determine a bias definition vector (304). For example, the debias pipeline 102 may identify, in the word embedding model, a first vector representative of a first bias category and a second vector representative of a second bias category. The debias pipeline 102 may subtract the first vector from the second vector to determine the bias definition vector. Alternatively, the debias pipeline 102 may subtract the second vector from the first vector to determine the bias definition vector. As previously discussed in reference to FIGS. 1 and 2, the debias definition vector may be defined along a bias axis in the word embedding model space. The bias axis may represent a bias type.

The debias pipeline 102 may obtain bias classification criteria (306). The bias classification criteria may include logic to group the vectors into a first group and a second group based on a semantic similarity score, such as a distance measurement from the bias definition vector. As previously discussed in reference to FIGS. 1 and 2, the distance measurement may include a measurement based on angular similarity and/or angular distance. The bias classification criteria may compare the distance measurement with a bias threshold. The bias threshold may initially be set to a default value, such as a cosine similarity of 0.3. Alternatively or in addition, the bias threshold may be calibrated to adjust the number of vectors included in the first bias vector group and/or the second bias vector group.

The debias pipeline 102 may identify a first group of vectors and a second group of vectors based on the bias classification criteria (308). The first group of vectors may be representative of words in the first bias category. The second group of vectors may be representative of words in the second bias category.

The debias pipeline 102 may generate a debiased intelligence model (310). The debiased intelligence model may include associations between words and metrics. For example, the artificial intelligence model may include, or be trained on, metrics for words in the first bias category and metrics for words in the second bias category. The metrics for the words in the first and second bias category may be penalized based on a penalization factor. The penalization factor may include a non-zero value that is calibrated to maintain model accuracy while penalizing bias in the debiased artificial intelligence model. In some examples, the debiased artificial intelligence model may include an updated word embedding model. For example, the word embedding model initially provided to the debias pipeline 104 may be iteratively updated until debias criteria is satisfied. Alternatively or in addition, the debiased artificial intelligence model may include a TF-IDF model.

Figure 4:
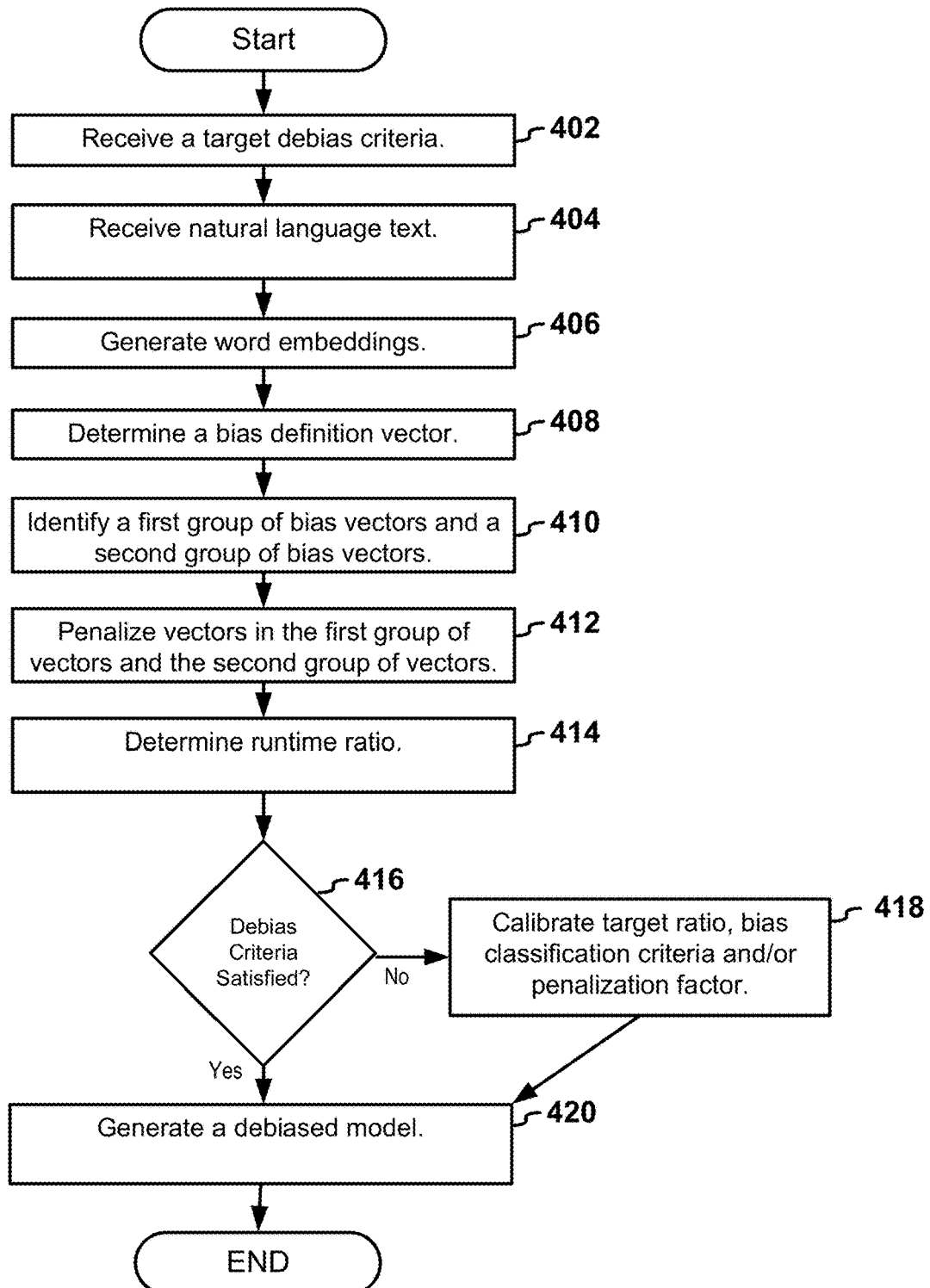
FIG. 4 illustrates a flow diagram for example logic of a system.

FIG. 4 illustrates a flow diagram for example logic of the system 100. The debias pipeline 102 may receive a target word ratio (402). The target word ratio may include a ratio based on a number of words in a first bias vocabulary and words in a second bias vocabulary. In some examples, the target word ratio may be received via a graphical user interface. For example, the debias pipeline 102 may generate an interactive view with a control configured to receive the target word ratio. The target word ratio may be sent to the debias pipeline 102 in response to interaction with the graphical user interface.

The debias pipeline 102 may receive natural language text (404). In some examples, the natural language text may be uploaded to the debias pipeline 102. Alternatively or in addition, baseline model data (e.g. training data, annotations, a baseline models) may be communicated to the debias pipeline 102. In some examples, the debias pipeline 102 may generate an interactive view that enables files to be uploaded. The files may include the natural language text and/or the baseline model data. Alternatively or in addition, the files may be communicated to the debias pipeline 102 from some other remote server and/or source. For example, an organization may communicate, job recommendations, resumes, or other natural language text to the debias pipeline 102.

The debias pipeline 102 may generate a word embedding model (406). The debias pipeline 102 may access the NLP framework 104 to generate the word embedding model based on the natural language text. For example, the debias pipeline 102 may extract a corpus of words from the natural language text. The debias pipeline 102 may generate the word embedding model based on the corpus of words.

The debias pipeline 102 may determine a bias definition vector 408. The debias pipeline 102 may identify a first group of bias vectors and a second group of bias vectors (410). The debias pipeline 102 may penalize the vectors in the first group of bias vectors and the second group of bias vectors (412). For example, the debias pipeline 102 may determine the bias definition vector and determine/penalize the groups of vectors as previously discussed in reference FIGS. 1-2 and in operation 304 described in reference to FIG. 3.

The debias pipeline 102 may determine a runtime word ratio (414). To determine the runtime word ratio, the debias pipeline 102 may determine a new first group of bias vectors and a new second group of bias vectors, after the penalization occurs. For example, the debias pipeline 102 may identify the new first group of vectors and the new group of second vectors by applying the bias classification criteria to an updated word embedding model. The run-time word ratio may be determined based on a relationship between the number of vectors in the new first group and a number of vectors in the new second group. For example, the run-time word ratio may include the number of vectors in the first new group divided by the number of vectors in the second new group.

The debias pipeline 102 may determine whether the debias criteria is satisfied (416). For example, the debias criteria may include logic that compares the target word ratio with the runtime word ratio. The criteria may apply a tolerance to determine if a runtime word ratio is satisfactory. For example, the debias criteria may determine whether the following equation is satisfied:

$$R_{runtime} = R_{target} \pm (R_{target})(X)$$

Where $R_{runtime}$ is the runtime word ratio, $R_{target}$ is the target word ratio, and X is a tolerance value. The tolerance value may include, for example 0.10 for 10% tolerance.

In response to the debias criteria not being satisfied (416, no), the debias pipeline 102 may calibrate the bias classification criteria, the target ratio, and/or the penalization factor (418). For example, the debias pipeline 102 may iteratively update an embedding model based on changes to the bias classification criteria, the target ratio, and/or the penalization factor. For example, the debias pipeline 102 may first try to calibrate the bias classification criteria. After calibrating the bias classification criteria, the debias pipeline 102 may update the word embedding model and then re-determine the runtime ratio. In response to the runtime ratio not satisfying the debias criteria, the debias pipeline 102 may calibrate the target word ratio. In other words, when a target ratio is not obtainable, the debias pipeline 102 may determine the next-best alternative. Based on the calibrated target ratio and the debias pipeline 102 may incrementally calibrate the bias classification criteria and/or the penalization factor until the debias criteria is satisfied. If the debias criteria is not satisfied, then the debias pipeline 102 may continue to calibrate the target ratio and/or the penalization factor until the debias criteria is satisfied. Refer to FIG. 5, and the related description, for additional discussion of the target ratio, the bias classification, and the penalization factor.

In response to the debias criteria being satisfied (416, yes), the debias pipeline 102 may generate a debiased artificial intelligence model (420). Generation of the debiased artificial intelligence model is described in reference to FIG. 1 and in operation 310 of FIG. 3.

FIG. 5 illustrates a flow diagram for example logic of the system 100. The debias pipeline 102 may obtain the target debias criteria and a word embedding model (502). For example, the target debias criteria may include a target word ratio. The target work ratio may be provided to a field in an interactive view of a graphical user interface.

The debias pipeline 102 may calibrate the bias classification criteria (504). To calibrate the bias classification criteria, the bias pipeline 102 may compare the runtime target ratio with the target word ratio. When the runtime word ratio is greater than the target word ratio, the debias pipeline 102 may decrease the number of vectors in a first bias group and increase the number of vectors in a second bias group. When the runtime word ratio is less than the target word ratio, the debias pipeline 102 may increase the number of vectors in the first bias group and decrease the number of vectors in the second bias group.

As previously discussed in reference to FIG. 1, a first bias threshold α may govern how many vectors are included in the first bias vector group and a second bias threshold β may govern how many vectors are included in the second bias vector group. Thus, the debias pipeline 102 may vary α and β until the ratio of vectors in the first group and the second group is close (e.g. within 10% or some other predetermined tolerance value) or equal to the target word ratio. In some examples, the debias pipeline 102 may incrementally change the first and second bias thresholds until the ratio of vectors in each group is within a tolerance of the target ratio, such as +/−10% or less of the target ratio.

The debias pipeline 102 may penalize the vectors included in the first and second bias vector groups and re-determine the run-time ratio (506). For example, the debias pipeline 102 may penalize the vectors in the first bias vector group and the second bias vector group based on a default penalization factor of 0.3. The debias pipeline 102 may update the word embedding model. The debias pipeline 102 may re-determine the runtime ratio based on the first bias vector group and the second bias vector group in the updated word embedding model.

The debias pipeline 102 may determine whether the debias criteria was satisfied (508). For example, the debias pipeline 102 may compare the runtime ratio with the target ratio to see if the runtime ratio is within an acceptance tolerance (e.g. +/−10% or some other predetermined tolerance value) of the target ratio.

In response to the debias criteria not being satisfied (508, no), the debias pipeline 102 may obtain a default classification criteria and a default penalization factor (510). The default values are obtained so that the target ratio may be calibrated. As described below, the classification criteria and the penalization factor may be calibrated based on incremental changes to the target ratio.

The debias pipeline 102 may calibrate the target ratio (512). For example, it may not be possible to maintain model performance and obtain the original target ratio. In these circumstances, if the target ratio is greater than the previously determined runtime ratio, then the debias pipeline 102 may decrease the first side of the ratio (representative of the first bias category) and increase the second side of the ratio (representative of the second bias category). Alternatively, if the target ratio is less than the runtime ratio, then the debias pipeline 102 may increase the first side of the ratio and decrease the second side of the ratio. In some examples, calibrating the target ratio may include incrementing one side and decrementing the other side by a default incremental value, such as 0.2.

The debias pipeline 102 may calibrate the bias classification criteria (514). For example, after the target ratio is adjusted, the debias pipeline 102 may calibrate the bias classification criteria based on the adjusted target ratio (see operation 504 above for an example of how to calibrate the bias classification criteria).

The debias pipeline 102 may penalize vectors and re-determine a runtime ratio (516). For example, after the target ratio and bias classification criteria are calibrated, the debias pipeline 102 may re-determine the first bias vector group and the second bias vector group based on the calibrated bias classification criteria. The debias pipeline 102 may penalize the vectors in the first bias vector group and the second bias vector group based on a default penalization value. After penalizing, the debias pipeline 102 may generate an updated embedding model. The debias pipeline 102 may re-determine which vectors are included in the first bias vector group and the second bias vector group for the updated model. The debias pipeline 102 may re-determine the runtime ratio based on the updated model.

The debias pipeline 102 may determine if the debias criteria is satisfied (518). In response to the debias criteria not being satisfied (518, no), the debias pipeline 102 may decrease the penalization factor (520). The debias pipeline 102 may penalize vectors and then re-determine the runtime ratio (522). For example, the debias pipeline 102 may penalize the first bias vector group and the second bias vector group. The debias pipeline 102 determine the runtime ratio after applying the reduced penalization factor.

The debias pipeline 102 may determine if the debias criteria is satisfied (520). In response to the debias criteria not being satisfied, the debias pipeline 102 may iteratively recalibrate the target ratio, recalibrate the bias classification criteria 514, and recalibrate the penalization factor via operations 512-522.

The operation for the logic illustrated in FIG. 3-5 may be implemented in various orders. In addition, the logic may include additional or fewer operations than illustrated.

Figure 6:
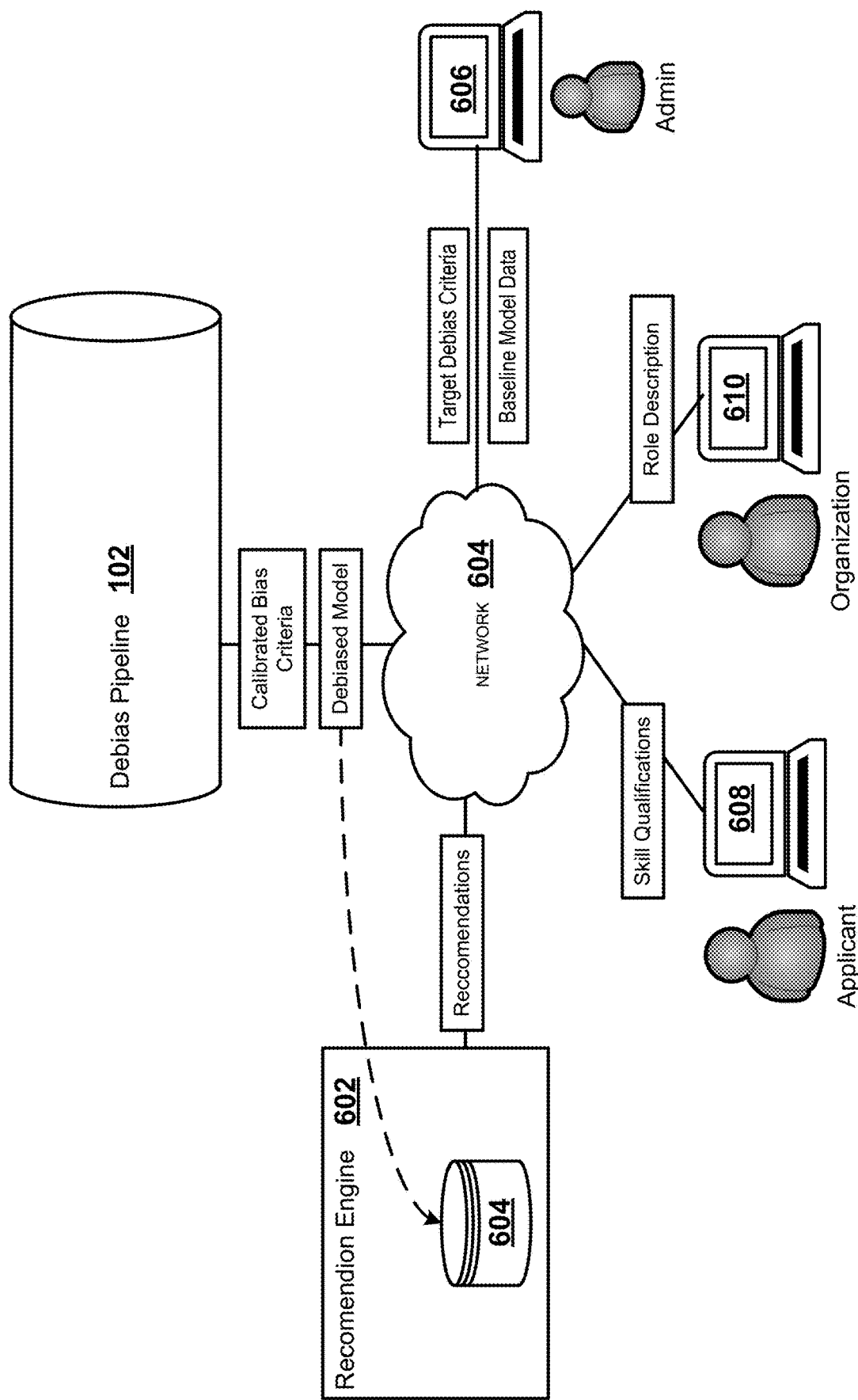
FIG. 6 illustrates a third example of a system.

FIG. 6 illustrates a third example of the system 100. The system may include a recommendation engine 602. The recommendation engine 602 may access one or more artificial intelligence models from a model repository 604. The recommendation engine 602 may make inferences based on the one or more artificial intelligence models. The debias pipeline 102 may deploy a debiased artificial intelligence model to the recommendation engine 602. The recommendation engine may store the debiased artificial intelligence model in the model repository 604 and create computer-generated inferences based on the debiased artificial intelligence model.

An admin device 606 may communicate the baseline model data. Alternatively or in addition, the admin device 606 may communicate a target debias criteria, such as the target word ratio, which the debias pipeline 102 receives to perform debiasing, as described herein. The debias pipeline 102 may generate one or more interactive views for a graphical user interface displayed on the admin device 606. The views may include controls to receive the target word ratio, the baseline model data, and/or the role description data. Alternatively or in addition, the views may display parameters generated by the debias pipeline 102, such as an adjusted target word ratio and/or a run-time word ratio. Accordingly, a user may be able to compare the target debias criteria with the run-time debiasing results to determine if debiased model is sufficiently debiased.

The debias pipeline 102 may generate a word embedding model based on the target debias criteria and/or the baseline model data. The debias pipeline 102 may debias the word embedding model as previously discussed in FIGS. 1-5. The debias pipeline 102 may generate the debiased model, such as an updated word embedding model or a TF-IDF model.

In some examples, the baseline model data may include the skill qualification text and/or roles qualification text. The baseline model data may include annotated training data to train an artificial intelligence model to generate inferences that associate skill descriptions with role qualifications.

The recommendation engine 602 may receive the debiased model and store the debiased model in the model repository 604. After the debiased model is stored in the model repository 604, the recommendation engine 602 may receive input data used to generate inferences based on the debiased model. For example, skill qualifications may be submitted by an applicant device 608 and roll description text may be submitted by an organization device 610. The applicant device 608 may include, for example, a device of a user submitting skill qualification (e.g. resumes). The organization device 610 may include a device for an organization submitting a role description (e.g. a job description).

The recommendation engine 604 may generate inferences based on the debiased artificial intelligence model to associate one or more skill qualifications with one or more role descriptions. The recommendation engine may generate a report or an interactive view for a graphical user interface that displays mappings between roles and job descriptions.

The skill qualifications text may include text representative of skills of a person, or persons. The skill qualification text may include groups of text organized by file, section, or delimiter. For example, the skill qualification text may include resume text associated with identifiers of an individual. Alternatively or in addition, the skill qualification text may include a personnel record for an organization. In other examples, the skill qualification may include web page information from a social media website. In general, the skill qualification text may include natural language text descriptive of the skill, qualifications, or abilities of an individual, or group of individuals.

The role description text may include text, such as natural language text, descriptive of a role or roles. The role description text may describe attributes of personnel that are desirable and/or required for a particular responsibility or position. For example, the role qualifications text may include a job description.

By way of example, the system 100 may be implemented in a system to reduce gender bias for an artificial intelligence model that matches resumes with job descriptions. The debias pipeline 102 may receive a user-defined definition of bias in the context of resume matching. For example, the user-defined definition of the bias may include a difference of more than +/−5% between the absolute gender ratio of applicants applying to a role from the gender ratio of candidates proposed to the role. For example, if 60% of applicants to a role were women, then no less than 55% and no more than 65% women should be proposed by an artificial intelligence model.

The debias pipeline 102 may generate a word embedding model based on a corpus of resumes and job descriptions. The debias pipeline 102 may compute the bias definition vector by subtracting the embedded vector representative of a male category from the embedded vector representative of a female category. The resultant bias definition may be defined along a bias axis in the embedding space. The pipeline may calculate a cosine distance between words to the gender axis (e.g. from 1 for men to −1 for women). The pipeline may apply a bias threshold to determine which vectors to penalize. For example, if the bias threshold is 0.1, words with a cosine similarity greater than 0.1 and less than −0.1 will be penalized. To perform the debasing, the debias pipeline 102 may perform the pseudo logic described in Table 2.

TABLE 2

Pseudo Logic for Debias Pipeline
Pseudo Logic

1. Set target debias criteria. The target debias criteria may include a user-defined target ratio.
2. Set default bias classification criteria. Bias threshold = 0.1, penalisation factor = 0.3. These default values may be determined through experimentation.
3. Apply bias threshold, penalisation factor and compare runtime word ratio with target word ratio.
4. Based on default bias threshold (0.1 in this example), determine whether number of male or female biased words is highest. (For purposes of this example, assume male bias words are highest)
5. Find new male and female bias thresholds through series of X decrements of 0.01 to lower category followed by X increments of 0.01 to higher category. In this example, X decrements of 0.01 to female biased threshold, followed by X decrements of 0.01 to male biased threshold. In other examples, increment/decrement values other than 0.01 may be used.
6. Generate a new embedding model where the vectors for the male and female bias words are penalized, keeping the penalisation factor at default (0.3, in this example). Determine a runtime word ratio based on the new model.
7. If the target debias criteria is not satisfied, execute operation 8
8. Execute operation 2.
9. Change target word ratio by incrementing side of ratio for lowest category (female, in this example) by 0.02, and decrementing side of ratio for highest category (male, in this example) by 0.02. In other examples, alternative increment and decrement values may be applied.
10. Execute operation 5 and then operation 6. If the target debias criteria is not satisfied, proceed to step 11.
11. Decrement penalisation factor by 0.02. In other examples, other decrement values may be applied.
12. Determine runtime ratio based on the bias thresholds from operation 9, penalisation factor from step 11.

TABLE 2-continued

Pseudo Logic for Debias Pipeline
Pseudo Logic

13. If target debias criteria is not satisfied, execute operation 9, 5, and 12
14. If target debias criteria is not satisfied, iteratively run steps 11-13 until debias criteria is satisfied.

In some examples, calibrating of the bias threshold and/or the penalization factor may be bounded by a tolerance criteria. The tolerance criteria may include criteria that establishes a range or bound that the bias classification criteria, penalization factor, and/or target word ratio may be calibrated. The tolerance criteria may include bias threshold tolerance criteria. The bias threshold tolerance criteria may permit a bias threshold to only be calibrated within a range, such as 0.05 to 0.15. Alternatively or in addition, the tolerance criteria may include a penalization tolerance criteria. The penalization tolerance criteria may permit the penalization factor to only be calibration within a range, such as 0.2 to 0.6. If the tolerance criteria is no longer satisfied, the debias pipeline 102 may abort debiasing.

The system 100 may be implemented with additional, different, or fewer components than illustrated. Each component may include additional, different, or fewer components. In some examples, the system may include the debias pipeline 102. Alternatively or in addition, the system may include the debias pipeline 102 with the recommendation engine 602.

Figure 7:
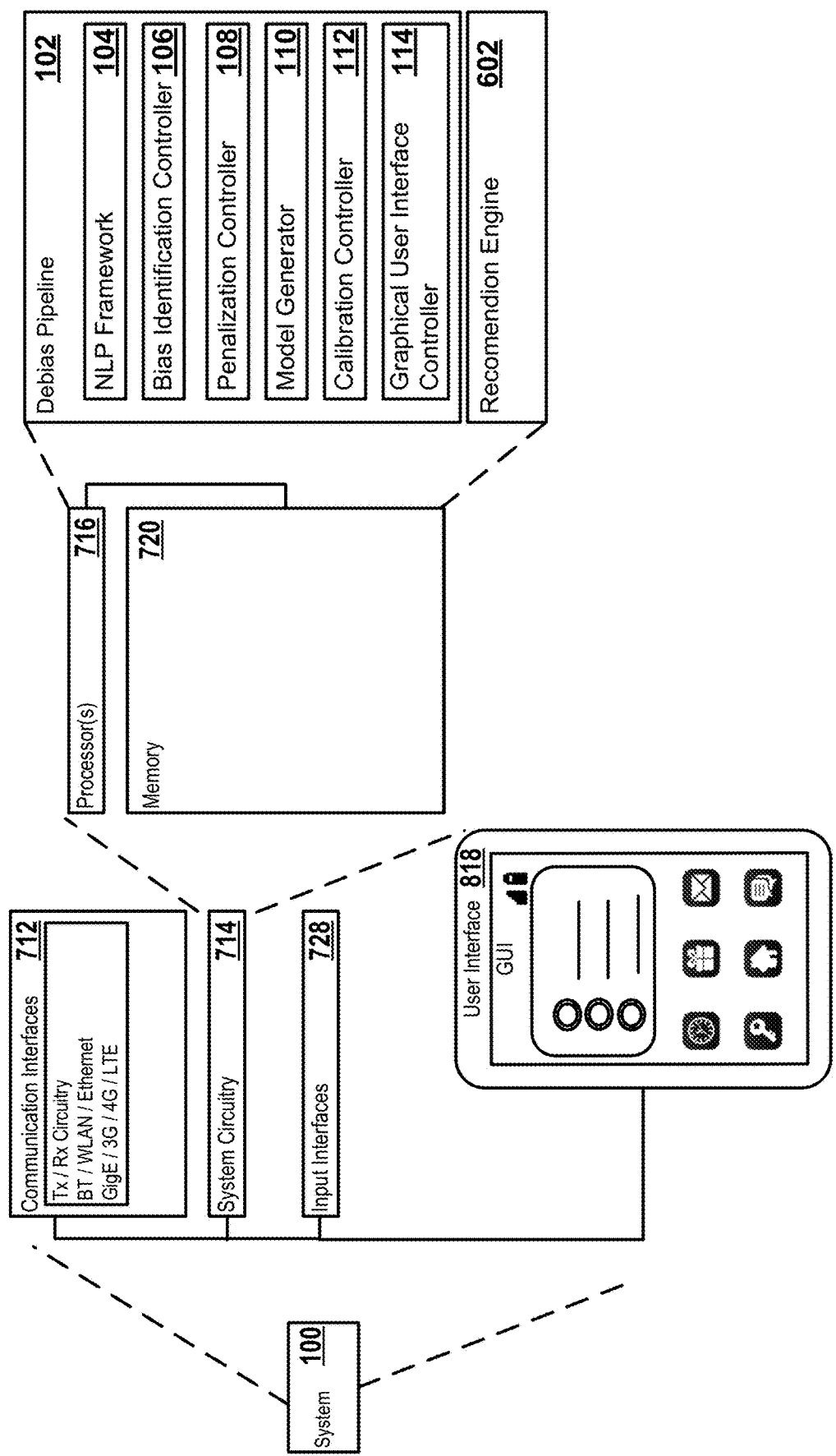
FIG. 7 illustrates a fourth example of a system.

FIG. 7 illustrates a fourth example of the system 100. The system 100 may include communication interfaces 712, input interfaces 728 and/or system circuitry 714. The system circuitry 714 may include a processor 716 or multiple processors. Alternatively or in addition, the system circuitry 714 may include memory 720.

The processor 716 may be in communication with the memory 720. In some examples, the processor 716 may also be in communication with additional elements, such as the communication interfaces 712, the input interfaces 728, and/or the user interface 718. Examples of the processor 716 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 716 may be one or more devices operable to execute logic. The logic may include computer executable instructions or computer code stored in the memory 720 or in other memory that when executed by the processor 716, cause the processor 716 to perform the operations the debias pipeline 102, the NLP framework 104, the bias identification controller 106, the penalization controller 108, the model generator 110, the calibration controller 112, the graphical user interface controller 114, the recommendation engine 602, and/or the system 100. The computer code may include instructions executable with the processor 716.

The memory 720 may be any device for storing and retrieving data or any combination thereof. The memory 720 may include non-volatile and/or volatile memory, such as a random access memory (RAM), a read-only memory (ROM), an erasable programmable read-only memory (EPROM), or flash memory. Alternatively or in addition, the memory 720 may include an optical, magnetic (hard-drive), solid-state drive or any other form of data storage device. The memory 720 may include at least one of the debias pipeline 102, the NLP framework 104, the bias identification controller 106, the penalization controller 108, the model generator 110, the calibration controller 112, the graphical user interface controller 114, the recommendation engine 602, and/or the system 100. Alternatively or in addition, the memory may include any other component or sub-component of the system 100 described herein.

The user interface 718 may include any device or interface for displaying graphical information. The system circuitry 714 and/or the communications interface(s) 712 may communicate signals or commands to the user interface 718 that cause the user interface to display graphical information. Alternatively or in addition, the user interface 718 may be remote to the system 100 and the system circuitry 714 and/or communication interface(s) may communicate instructions in various formats, such as HTML, Javascript, CSS, etc., to the user interface to cause the user interface to display, compile, and/or render information content. In some examples, the content displayed by the user interface 718 may be interactive or responsive to user input. For example, the user interface 718 may communicate signals, messages, and/or information back to the communications interface 712 or system circuitry 714.

The system 100 may be implemented in many different ways. In some examples, the system 100 may be implemented with one or more logical components. For example, the logical components of the system 100 may be hardware or a combination of hardware and software. The logical components may include the debias pipeline 102, the NLP framework 104, the bias identification controller 106, the penalization controller 108, the model generator 110, the calibration controller 112, the graphical user interface controller 114, the recommendation engine 602, and/or the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 720, for example, that comprises instructions executable with the processor 716 or other processor to implement one or more of the features of the logical components. When any one of the logical components includes the portion of the memory that comprises instructions executable with the processor 716, the component may or may not include the processor 716. In some examples, each logical component may just be the portion of the memory 720 or other physical memory that comprises instructions executable with the processor 716, or other processor(s), to implement the features of the corresponding component without the component including any other hardware. Because each component includes at least some hardware even when the included hardware comprises software, each logic component may be interchangeably referred to as a hardware component.

Some features are shown stored in a non-transitory computer readable storage medium (for example, as logic implemented as computer executable instructions or as data structures in memory). All or part of the system and its logic and data structures may be stored on, distributed across, or read from one or more types of non-transitory computer readable storage media. Examples of the non-transitory computer readable storage medium may include a hard disk, a floppy disk, a CD-ROM, a flash drive, a cache, volatile memory, non-volatile memory, RAM, flash memory, or any other type of computer readable storage medium or storage media.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, or other hardware that holds information temporarily or permanently. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over infrastructure communication lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory.

Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system for reducing bias in an artificial intelligence model, the system comprising:
    a processor and a computer readable medium, the computer readable medium comprising instructions executable by the processor to:
        receive a word embedding model generated based on a corpus of words, the word embedding model comprising word vectors representative of the corpus of words;
        determine a bias definition vector based on the word embedding model, the bias definition vector being defined along a bias axis representative of a bias type in the word embedding model;
        receive a bias classification criteria, the bias classification criteria comprising logic to group the word vectors based on a distance measurement from the bias definition vector;
        identify, in the word embedding model, a first group of word vectors and a second group of word vectors based on the bias classification criteria and the bias definition vector, the first group of word vectors being representative of a first bias category for the bias type and the second group of word vectors being representative of a second bias category for the bias type;
        receive a target word ratio based on a quantity of words in the first bias category and a quantity of words in the second bias category;
        determine a run-time word ratio based on a quantity of word vectors in the first group of word vectors and a quantity of word vectors in the second group of word vectors;
        determine the run-time word ratio and the target word ratio do not satisfy a debias criteria configured to compare the run-time word ratio and the target word ratio;
        calibrate, in response to the debias criteria not being satisfied, the bias classification criteria to adjust the quantity of word vectors in the first group of word vectors and the quantity of word vectors in the second group of word vectors; and
        generate a debiased artificial intelligence model, the debiased artificial intelligence model comprising metrics representative of words, wherein metrics for words associated with the first group of word vectors and metrics for words associated with the second group of word vectors are weighted based on a non-zero penalization factor.

2. The system of claim 1, wherein the computer readable medium further comprises instructions executable by the processor to:
    receive a target word ratio, the target word ratio based on words in the first bias category and words in the second bias category;
    determine a runtime word ratio of vectors in the first group of word vectors to word vectors in the second group of word vectors;
    compare the target word ratio with the run-time word ratio based on a debias criteria,
    wherein the debiased artificial intelligence model is generated in response to satisfaction of the debias criteria.

3. The system of claim 2, wherein the computer readable medium further comprises instructions executable by the processor to:
    generate a user interface comprising a control configured to receive the target word ratio and a control to display the run-time word ratio.

4. The system of claim 1, wherein the computer readable medium further comprises instructions executable by the processor to:
    receive text indicative of skill qualifications and text indicative of role descriptions;
    map, based on the debiased artificial intelligence model, at least one of the skill qualifications to the at least one of the role descriptions; and
    display a report indicative of the mapping between the at least one of the skill qualifications and the at least one of the role descriptions.

5. The system of claim 1, wherein the computer readable medium further comprises instructions executable by the processor to:
    receive text indicative of skill qualifications and text indicative of role descriptions;
    extract the corpus of words from the text indicative of skill qualifications and text indicative of role descriptions; and
    generate the word embedding model based on the corpus of words.

6. The system of claim 5, wherein the text indicative of skill qualifications comprise text from a resume and the text indicative of role descriptions comprise text from a job description.

7. The system of claim 1, wherein the instructions to determine the bias definition vector further comprise instructions executable by the processor to:
    identify, in the word embedding model, a first word vector representative of a first word, the first word being descriptive of the first bias category;

identify, in the word embedding model, a second word vector representative of a second word, the second word being descriptive of the second bias category; and calculate the bias definition vector based on vector subtraction between the first word vector and the second word vector.

8. The system of claim 1, wherein the first bias category is indicative of a male gender bias and the second bias category is indicative of a female gender bias.

9. The system of claim 1, wherein the debiased artificial intelligence model comprises a new word embedding model, a term frequency-inverse document frequency (TF-IDF) model, or any combination thereof.

10. The system of claim 1,
wherein to calibrate, in response to the debias criteria not being satisfied the bias classification criteria to adjust the quantity of word vectors in the first group of word vectors and the quantity of word vectors in the second group of word vectors, the instructions are further executable by the processor to:
increment the target ratio by a threshold value;
in response to incrementing the ratio, adjust a first bias threshold to decrease the quantity of word vectors in the first group of word vectors and adjust a second bias threshold to increase the quantity of word vectors in the second group of word vectors;
generate a word embedding model where the word vectors from the first group and the word vectors from the second group are weighted based on the penalization factor;
adjusting, based on the adjusted first bias threshold and the adjusted second bias threshold, the respective word vectors included in the first group of word vectors and the second group of word vectors;
generate a new run-time word ratio based on the first group of word vectors and the second group of word vectors; and
determine the new run-time word ratio and the target word ratio satisfy the debias criteria,
wherein the debiased artificial intelligence model is generated in response to satisfaction of the debias criteria.

11. The system of claim 10, wherein the computer readable medium further comprises instructions executable by the processor to:
decrease the penalization factor before the word embedding model is generated.

12. The system of claim 1, wherein the computer readable medium further comprises instructions executable by the processor to:
generate a user interface comprising a control configured to receive the non-zero penalization factor defined by a user.

13. The system of claim 1, wherein the bias classification criteria is configured to group the word vectors by comparing a semantic similarity score of each word vector relative to the bias definition vector.

14. The system of claim 1, wherein the computer readable medium further comprises instructions executable by the processor to:
receive a user-defined threshold parameter, and compare a semantic similarity score of each word vector relative to the user-defined threshold parameter.

15. A method comprising:
receiving a word embedding model generated based on a corpus of words, the word embedding model comprising word vectors representative of the corpus of words;
determining a bias definition vector, the bias definition vector being defined along a bias axis representative of a bias type in the word embedding model;
receiving a bias classification criteria, the bias classification criteria comprising logic to group the word vectors into a first group of word vectors and a second group of word vectors based on a distance measurement from the bias definition vector, the first group of word vectors being representative of a first bias category for the bias type and the second group of word vectors being representative of a second bias category for the bias type;
identifying, in the word embedding model, the first group of word vectors and the second group of word vectors based on the bias classification criteria and the bias definition vector;
receiving a target word ratio based on a quantity of words in the first bias category and a quantity of words in the second bias category;
determining a run-time word ratio based on a quantity of word vectors in the first group of word vectors and a quantity of word vectors in the second group of word vectors;
determining the run-time word ratio and the target word ratio do not satisfy a debias criteria configured to compare the run-time word ratio and the target ratio; and
in response to the debias criteria not being satisfied,
calibrating a non-zero penalization factor, the bias classification criteria, or a combination thereof to adjust the quantity of word vectors in the first group of word vectors and the quantity of word vectors in the second group of word vectors;
re-determining the run-time ratio; and
determining the run-time word ratio and the target word ratio satisfy the debias criteria; and
generating, in response to satisfaction of the debias criteria, a debiased artificial intelligence model, the debiased artificial intelligence model comprising metrics representative of words, wherein the metrics for words associated with the first group of word vectors and metrics for words associated with the second group of word vectors are weighted based on the calibrated non-zero penalization factor.

16. A system comprising:
a processor, the processor configured to:
receive a word embedding model generated based on a corpus of words, the word embedding model comprising word vectors representative of the corpus of words;
determine a bias definition vector based on the the word embedding model, the bias definition vector being defined along a bias axis representative of a bias type in the word embedding model;
receive a bias classification criteria, the bias classification criteria comprising logic to group the word vectors based on a distance measurement from the bias definition vector;
identify, in the word embedding model, a first group of word vectors and a second group of word vectors based on the bias classification criteria and the bias definition vector, the first group of word vectors being representative of a first bias category for the bias type and the second group of word vectors being representative of a second bias category for the bias type;

receive a target word ratio based on a quantity of words in the first bias category and a quantity of words in the second bias category;

determine a run-time word ratio based on a quantity of word vectors in the first group of word vectors and a quantity of word vectors in the second group of word vectors;

determine the run-time word ratio and the target word ratio do not satisfy a debias criteria configured to compare the run-time word ratio and the target word ratio;

calibrate, in response to the debias criteria not being satisfied, the bias classification criteria to adjust the quantity of word vectors in the first group of word vectors and the quantity of word vectors in the second group of word vectors; and generate a debiased artificial intelligence model, the debiased artificial intelligence model comprising metrics representative of words, wherein the metrics for words associated with the first group of word vectors and metrics for words associated with the second group of word vectors are weighted based on a non-zero penalization factor.

17. The system of claim 16, wherein to calibrate, in response to the debias criteria not being satisfied, the bias classification criteria to adjust the quantity of word vectors in the first group of word vectors and the quantity of word vectors in the second group of word vectors the processor is further configured to:

adjust a bias threshold distance value, wherein the bias classification criteria comprises logic to identify the first group of word vectors or the second group of word vectors based on the bias threshold distance value, wherein the bias threshold distance value comprises a measure of distance from the bias definition vector.

18. The system of claim 16, wherein the processor is further configured to:

deploy the debiased artificial intelligence model to a server configured to create computer-generated inferences based on the debiased artificial intelligence model wherein the debiased artificial intelligence model comprises a new word embedding model, a term frequency-inverse document frequency (TF-IDF) model, or any combination thereof.

19. The system of claim 16, wherein to calibrate, in response to the debias criteria not being satisfied, the bias classification criteria to adjust the quantity of word vectors in the first group of word vectors and the quantity of word vectors in the second group of word vectors, the processor is further configured to:

increment the target ratio by a threshold value;

in response to incrementing the ratio, adjust a first bias threshold to decrease the quantity of word vectors in the first group of word vectors and adjust a second bias threshold to increase the quantity of word vectors in the second group of word vectors;

generate a word embedding model where the word vectors from the first group and the word vectors from the second group are weighted based on the penalization factor;

adjusting, based on the adjusted first bias threshold and the adjusted second bias threshold, the respective word vectors included in the first group of word vectors and the second group of word vectors;

generate a new run-time word ratio based on the first group of word vectors and the second group of word vectors; and determine the new run-time word ratio and the target word ratio satisfy the debias criteria, wherein the debiased artificial intelligence model is generated in response to satisfaction of the debias criteria.

* * * * *